Dec. 20, 1960 C. H. MASLAND 2ND 2,965,054

NEEDLING FABRIC, METHOD AND APPARATUS

Filed March 19, 1953 6 Sheets-Sheet 1

INVENTOR
Charles H. Masland, 2nd.
BY
ATTORNEYS.

Dec. 20, 1960 C. H. MASLAND 2ND 2,965,054

NEEDLING FABRIC, METHOD AND APPARATUS

Filed March 19, 1953 6 Sheets-Sheet 2

INVENTOR
Charles H. Masland, 2nd.
BY
[signature]
ATTORNEYS.

NEEDLING FABRIC, METHOD AND APPARATUS

Filed March 19, 1953 6 Sheets-Sheet 3

INVENTOR
Charles H. Masland, 2nd
BY
[signature]
ATTORNEYS.

INVENTOR
Charles H. Masland, 2nd.
BY
ATTORNEYS.

Dec. 20, 1960 C. H. MASLAND 2ND 2,965,054

NEEDLING FABRIC, METHOD AND APPARATUS

Filed March 19, 1953 6 Sheets-Sheet 5

INVENTOR
Charles H. Masland 2nd.
BY
[signature]
ATTORNEYS.

NEEDLING FABRIC, METHOD AND APPARATUS

Filed March 19, 1953 6 Sheets-Sheet 6

INVENTOR.
Charles H. Masland, 2nd,

BY

ATTORNEYS.

United States Patent Office 2,965,054

Patented Dec. 20, 1960

2,965,054

NEEDLING FABRIC, METHOD AND APPARATUS

Charles H. Masland 2nd, Carlisle, Pa., assignor to C. H. Masland & Sons, Carlisle, Pa., a corporation of Pennsylvania Filed Mar. 19, 1953, Ser. No. 343,362

4 Claims. (Cl. 112—79)

The present invention relates to the making of needled pile fabrics and the fabrics themselves, including both methods and apparatus for manufacture of the same.

A purpose of the invention is to provide for reliable control of the height of each individual pile projection in a needled pile fabric as distinguished from the control of several pile projections as a group.

A further purpose is to provide for formation of varying loops in the feed of individual pile yarn ends for needling, the loops being controlled in accordance with the pattern, so that thereby the heights of the individual pile projections are controlled, and the pile projections will as the pattern requires be different in the same transverse row and also longitudinally along the same pile end, permissibly with different heights for each pile projection both transversely and longitudinally.

A further purpose is to provide a more widely variant selection of heights of pile projections in a pile fabric.

A further purpose is to provide more gradual gradations of pile heights from zones of relatively great heights to zones of relatively less heights, without being limited to a very few different heights.

A further purpose is to selectively clamp a pile end on the side of a loop puller toward the needle and on the side toward the source, and during the retraction of the needle to close the clamp on the side toward the needle and open the clamp on the side toward the source and then advance the loop puller to pull the loop, while the needle is advancing to close the clamp on the side toward the source and open the clamp on the side toward the needle to make the loop available in feeding yarn to the needle, and by varying the length of the loop which is pulled to make variant yarn heights available.

A further purpose is to feed each individual yarn end to its needle of a gang of needles through an individual eye, to manipulate the eye by a pattern control and to selectively clamp each yarn end on opposite sides of the eye, closing the clamp on the side toward the needle when the eye is being advanced to pull loops and closing the clamp on the side toward the source when the eye is retracting and the needle is advancing.

A further purpose is to manipulate the eye by a pattern control lever individual to each eye, connecting the eye to one end of the lever, controlling the position of the remote end of the lever by a pattern control, suitably by a variant projection on a drum or a variant projection on a pattern chain or dobby chain, and to throw the lever to form the loop by mechanism which uniformly advances a common pivot intermediate the ends of all of the levers.

A further purpose is to permit color pattern control by making ends of a particular color form pile which is so low that it is partially or completely overshadowed by higher pile of adjoining ends of a different color and thus make it possible to have pattern control by color of pile ends in a needled pile fabric. In this way as many as two or three different colored areas may be created on the face of the fabric by producing low but still perceptible pile projections of the ends which are not to appear.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figures 7 to 11 inclusive are fragmentary perspectives showing successive positions of the needles and hooks during the needling process, omitting the backing.

Figure 1:
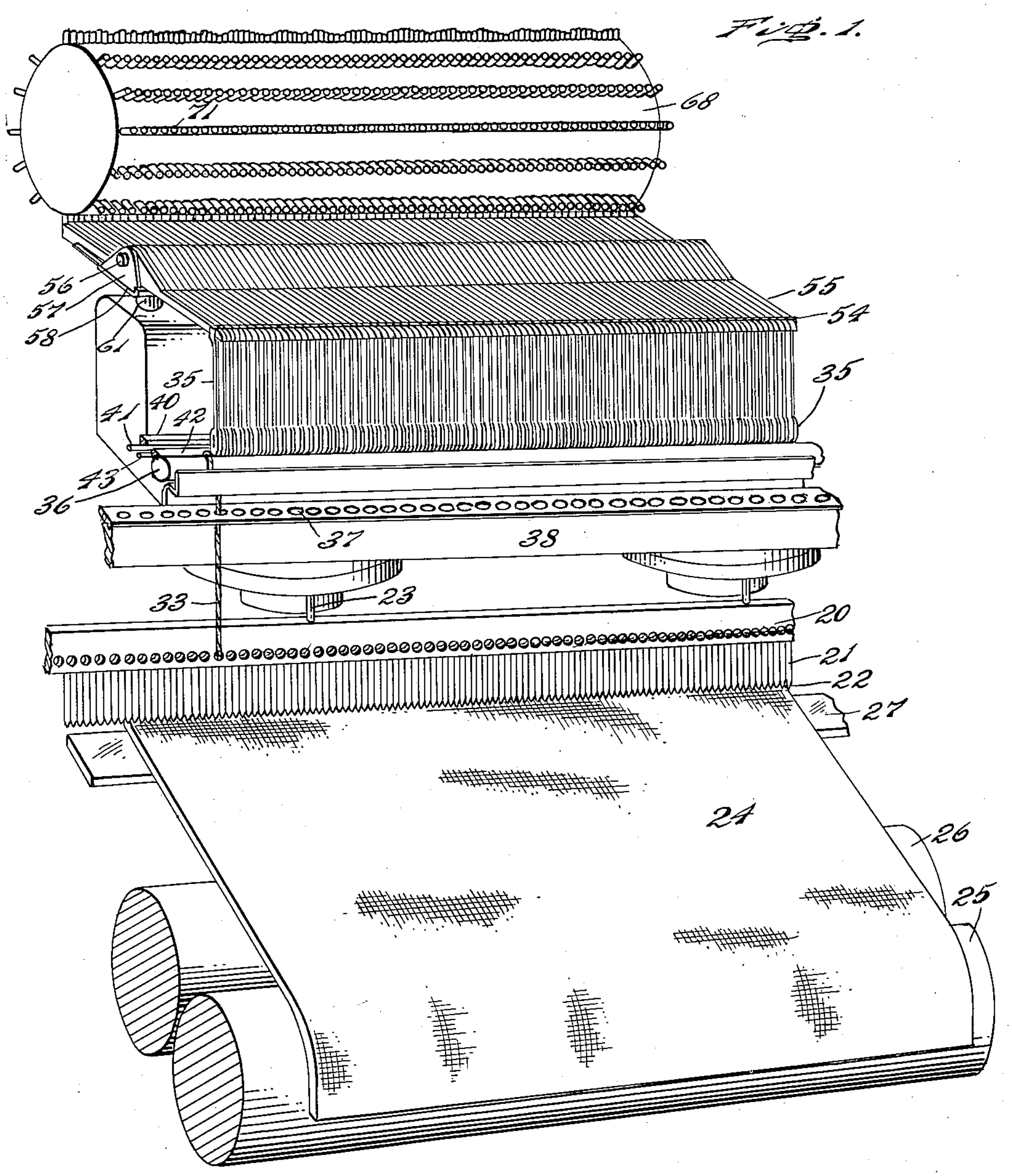
Figure 1 is a fragmentary diagrammatic perspective of a needling machine to which the invention has been applied.
Figures 2, 3:
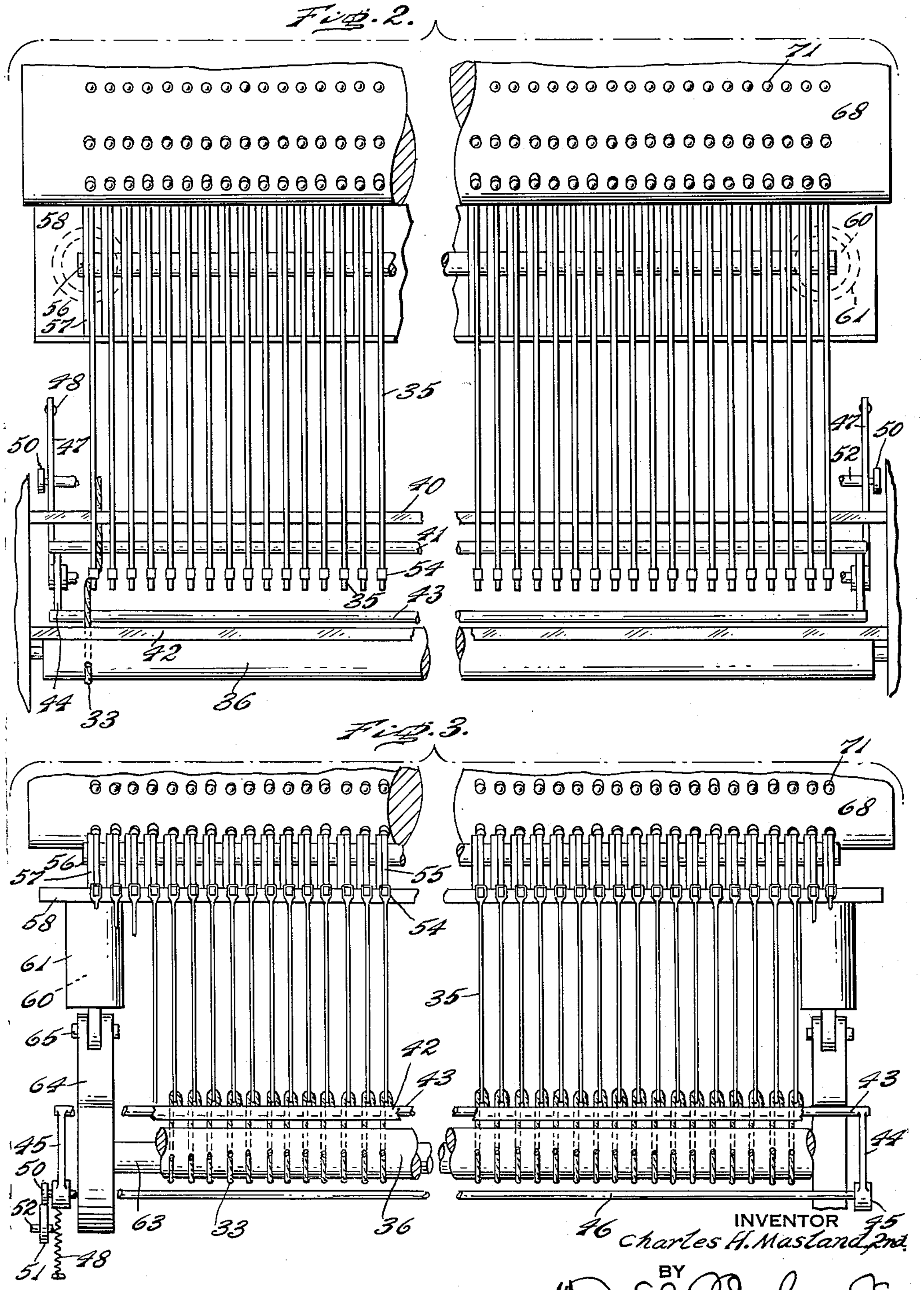
Figure 2 is a fragmentary top plan view of Figure 1.
Figure 3 is a fragmentary front elevation of Figure 1.
Figure 4:
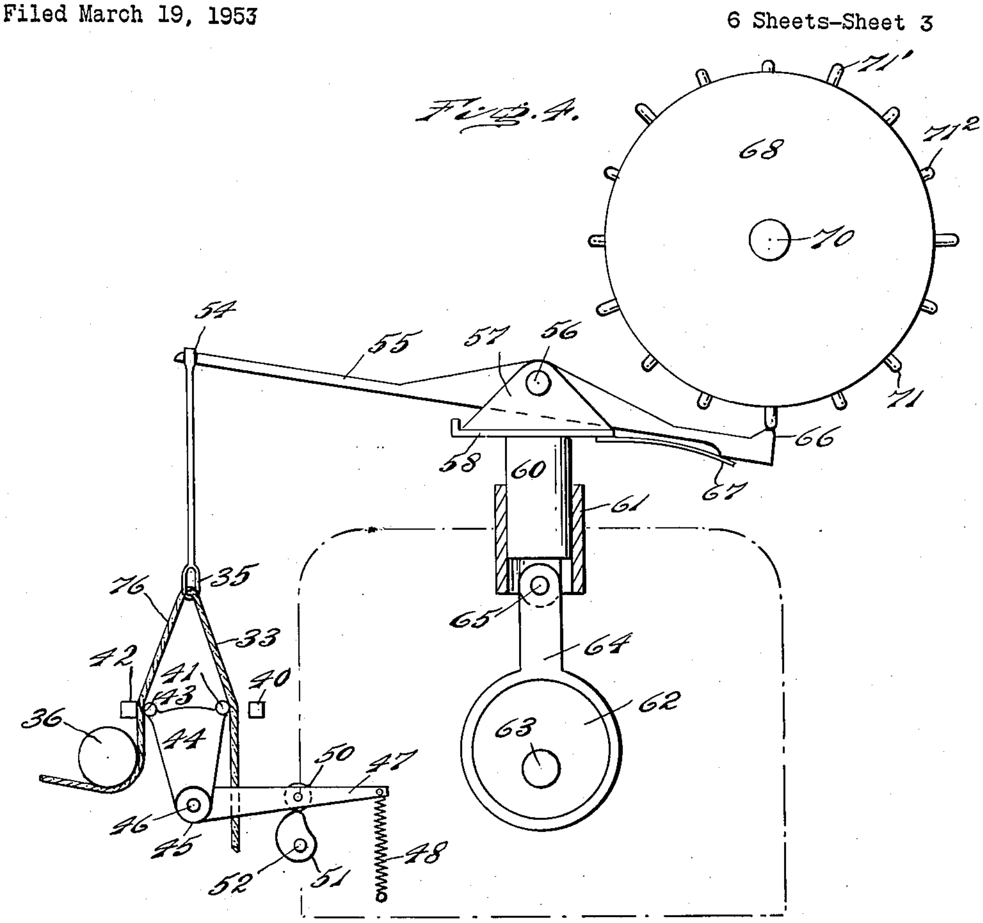
Figure 4 is a fragmentary diagrammatic end elevation of the yarn feed of Figures 1 to 3 in the position in which the needles are retracting and the yarn loops are being formed.
Figure 12:
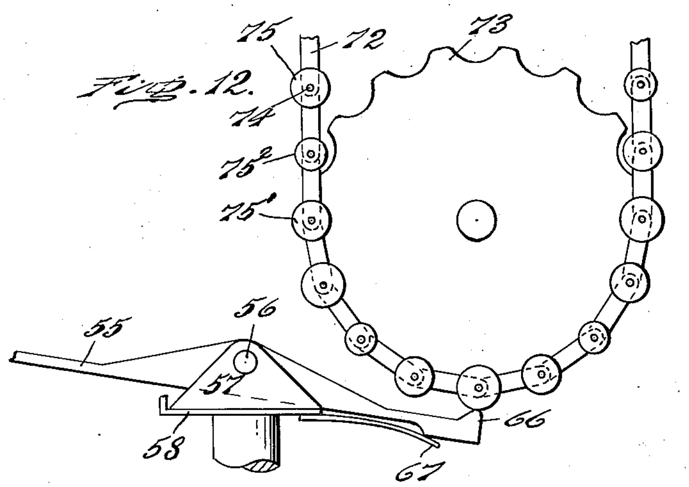

Figure 12 is a view corresponding to Figure 4, but showing a variation.

Figure 13:
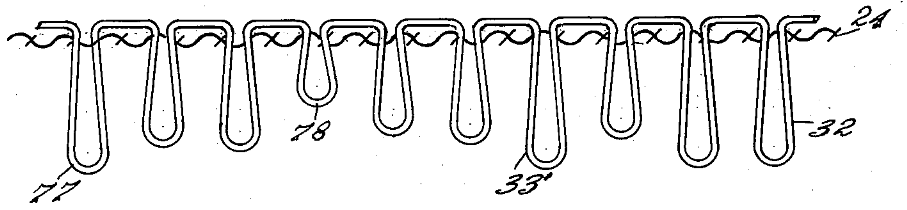

Figure 13 is a longitudinal section through the fabric of the invention at one pile end.

Figure 14:
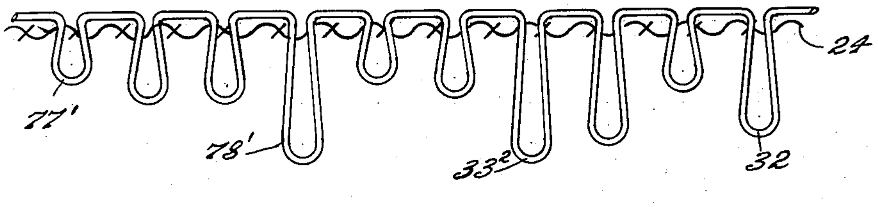

Figure 14 is a longitudinal section corresponding to Figure 13 but located at the next pile end.

Figure 15:
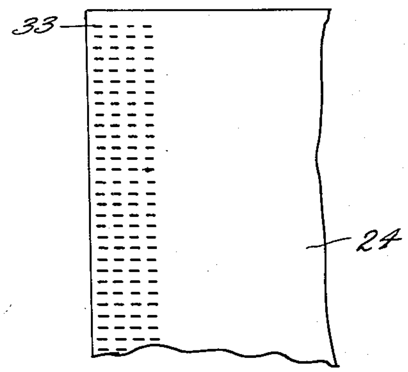

Figure 15 is a plan view showing the fabric of Figures 13 and 14 in the process of formation.

Figure 16:
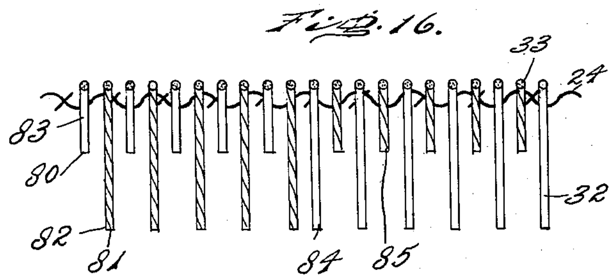

Figure 16 is a transverse section through a fabric of the invention, showing a modification in which pile ends of different colors are respectively masked in different areas.

Describing in illustration but not in limitation and referring to the drawings:

Pile fabrics such as carpets and rugs are extensively manufactured by punching, stitching or needling (herein called "needling") through a backing to raise pile projections of pile yarn, the projections being cut or uncut as desired. In normal practice a row or gang of needles having eyes near their points are advanced and retracted together to make stitches extending longitudinally, the gang of needles normally covering the entire width of the backing as the needling progresses.

Efforts have been made in the prior art to vary the height of the pile across an individual transverse row by varying the speed of turning of feeding wheels each of which feeds a group of pile ends. This is subject to the limitation however that many pile ends are varied in height together and there is no gradation between the height of one group of pile projections and the height of the next group of pile projections in the same transverse row.

One of the advantages of the present invention is that it permits complete pattern control of the height of pile of individual pile ends in each transverse row. Thus a particular pile yarn in one transverse row may create pile of one height and in the next transverse row may create pile of a still different height as the pattern requires, and the adjoining pile yarn ends on either side may in each row create pile of still different heights as dictated by the pattern.

This makes it possible to obtain textured or carved effects on the surface of the pile fabric, and has the great advantage that a very wide or even infinite variation in pile heights can be obtained within certain limits, instead of merely employing two or a very few pile heights as in some weaving procedures. It is thus possible to gradate or gradually change from a maximum height to a minimum height or vice versa without employing the abrupt changes which have been necessary in some of the prior practice. This not only favors more delicate patterning variation by height, but also promotes the patterning by shadows or variations in light reflection of the pile which are due to slight changes in height.

A further advantage of the invention is that where adjoining pile yarn ends are of different colors or of different tones of the same color, it is possible to create color patterning, which ordinarily has not been possible in needled pile fabrics. Thus where one pile yarn end is of one color and another pile yarn end on either side is of another color, it is possible to create areas which appear at the surface of the fabric to be wholly of one color and other areas which appear to be wholly of the other color by suppressing the color to be masked in relatively low pile projections which are hidden by relatively high pile projections of the color which is to be visible at the particular location. It is thus possible to combine patterning by height with patterning by color in any desired combination.

In accordance with the invention each yarn end is fed to its needle through an eye, and the yarn is alternately clamped on either side of the eye and at a suitable time the eye is moved through a variant stroke which will form a variant loop and thus vary the height of the pile projection. Thus during the retraction stroke the pile yarn ends are clamped between the eye and the needle but are freed between the yarn source and the eye, and at that stage the eye is moved through a variant stroke which is controlled individually for each eye by a pattern control. Thus a variant loop is formed and at a later stage a variant amount of yarn is available for feeding so that under the resilience of the yarn the ultimate pile projection formed will be of variant height. After the retraction stroke of the needles is over and the needles advance, the clamping between the eye and the needle is released and the yarn ends are clamped between the eye and the source so that during the advance of the needles the variant loop which has been formed is available to be fed to the pile projection.

Any suitable mechanism may be employed in varying the stroke of the eye. In the preferred embodiment the eye is manipulated by one end of a lever which is individual to the particular eye. The other end of the lever is variantly positioned by a pattern control, which may be a projection on a drum which is registered with the end of the lever or may be a projection on a pattern chain or dobby chain. At this point in the procedure, and while the pile yarn ends are clamped between the eye and the needle, the intermediate pivot of the lever is moved in a direction transverse to the length of the lever to form a loop by pulling yarn from the source. While the motion of the pivot of each lever will desirably be the same, the motion of the eye will be different depending on the position of the end of the lever which is under the control of the pattern device.

In the preferred embodiment of the invention, a multiple stitching machine is used which has a needle bar 20 mounting a laterally extending row of needles 21 each having a downwardly directed point 22 and an eye 23 near the point. The needles are advanced down and retracted up by a multiple needle stitching machine mechanism 23 as well known in the art. A backing 24, which is suitably a fabric such as burlap, osnaburg or the like, is advanced transversely to the row of needles over feed rolls 25 and 26 and over a supporting bar 27 immediately in front of the needles. As shown in Figures 7 to 11, guiding teeth 28 extend from bar 27 in the direction of advance of the backing at positions between the needle positions immediately below the backing to support the backing at the time the needles penetrate the backing.

As well known in the art and is best seen in Figures 7 to 11, a series of hooks 30 swing out one immediately adjoining the downward path of each needle and into a position immediately adjacent the needle path. The hooks are supported on a swinging hook bar 31.

Figures 7, 8, 9:
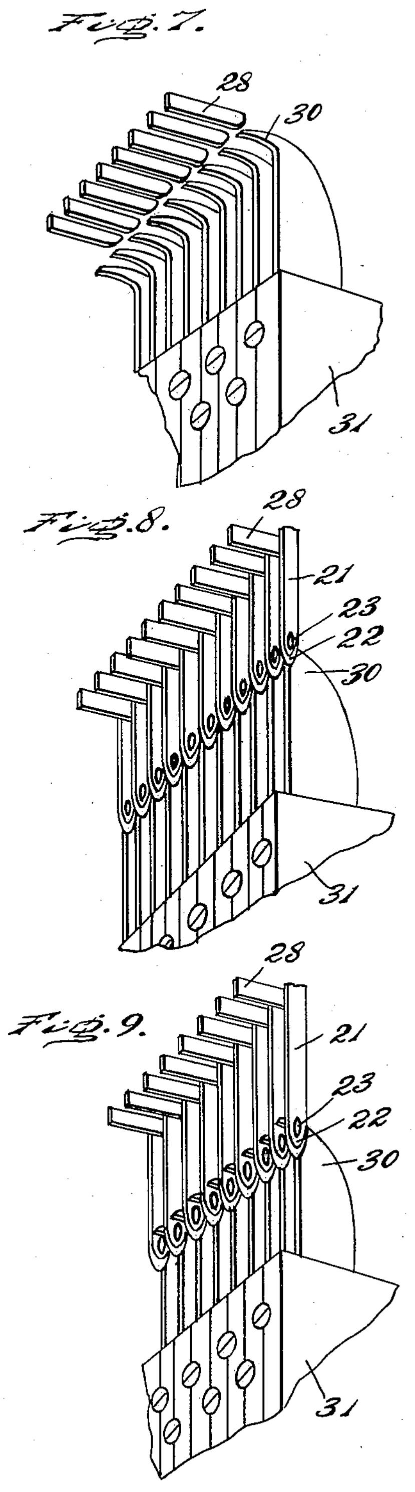
Figure 10:
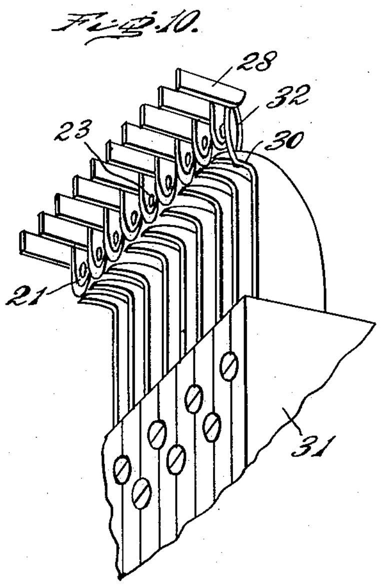
Figure 11:
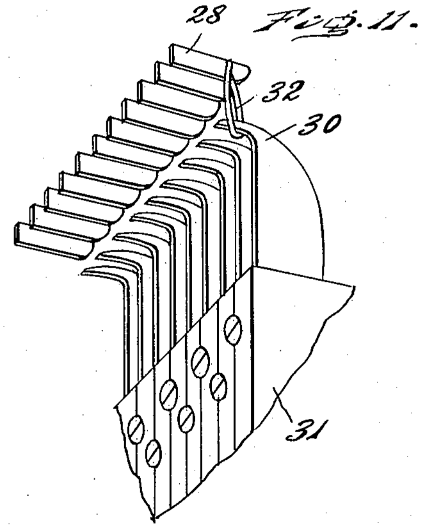

Figure 7 illustrates the hook below the teeth 28 while the needles are fully retracted in the position at which the backing fabric advances for the next stitch. Figure 8 shows the needles moving down. Each needle carries yarn in its eye, but the yarn is not shown in Figure 8. In Figure 9 the needles have moved down to a position in which the eyes carrying the yarn are below the prongs of the hooks. In this position the yarn of each needle becomes engaged over the adjoining hook which swings out to engage the yarn, and as the needles retract as a group in Figure 9 the yarn ends remain held by the hooks. One yarn loop which will form a pile projection is shown at 32 in Figure 10. Figure 11 shows the loop 32 after the needles have fully retracted. It will be understood that a similar loop will be held by each hook to form a transverse row of pile projections in the position of Figure 11. The hooks are withdrawn from the pile loops before the needles move down again and the hooks reach the position of Figure 7 for the next stitch.

In the form of Figures 1 to 12, each pile yarn end 33 which will make one of the longitudinal rows of pile projections 32 comes from a suitable source, desirably a creel (not shown) over suitable tensioning guides through a pattern control eye 35 which is individual for each pile yarn end, and then through suitable guides to the eyes of the needles here shown as consisting of a guiding roller 36 extending transversely of the machine and guiding openings 37 in a transversely extending guiding bar 38 above the needle bar.

On either side of the series of eyes 35, which run transversely of the machine in line with one another, there is located a clamp. Relatively stationary clamp jaw 40 adjoins the outsides of the yarn ends between the eyes 35 and the source of yarn, and it cooperates with a relatively movable clamp jaw 41 which is inside the yarn ends and likewise runs transversely of the machine.

On the other side of the row of eyes 35 between the eyes and the needles, and on the outsides of the yarn ends a relatively stationary clamp jaw 42 runs transversely of the machine, and a relatively movable clamp jaw 43 inside the yarn ends cooperates therewith.

The relatively movable clamp jaws 41 and 43 are supported suitably at each end on one arm 44 pivoted fixedly at 46 on the frame. At one end the arm 44 is part of a bell crank 45. The other arm 47 of the bell crank is urged in the clockwise direction in Figure 4 by spiral tension spring 48 anchored on the frame and carries a pivoted follower roller 50 which engages a peripheral cam 51 on a shaft 52 which turns in sequence with the needle advance and retraction mechanism as later explained.

Figure 5:
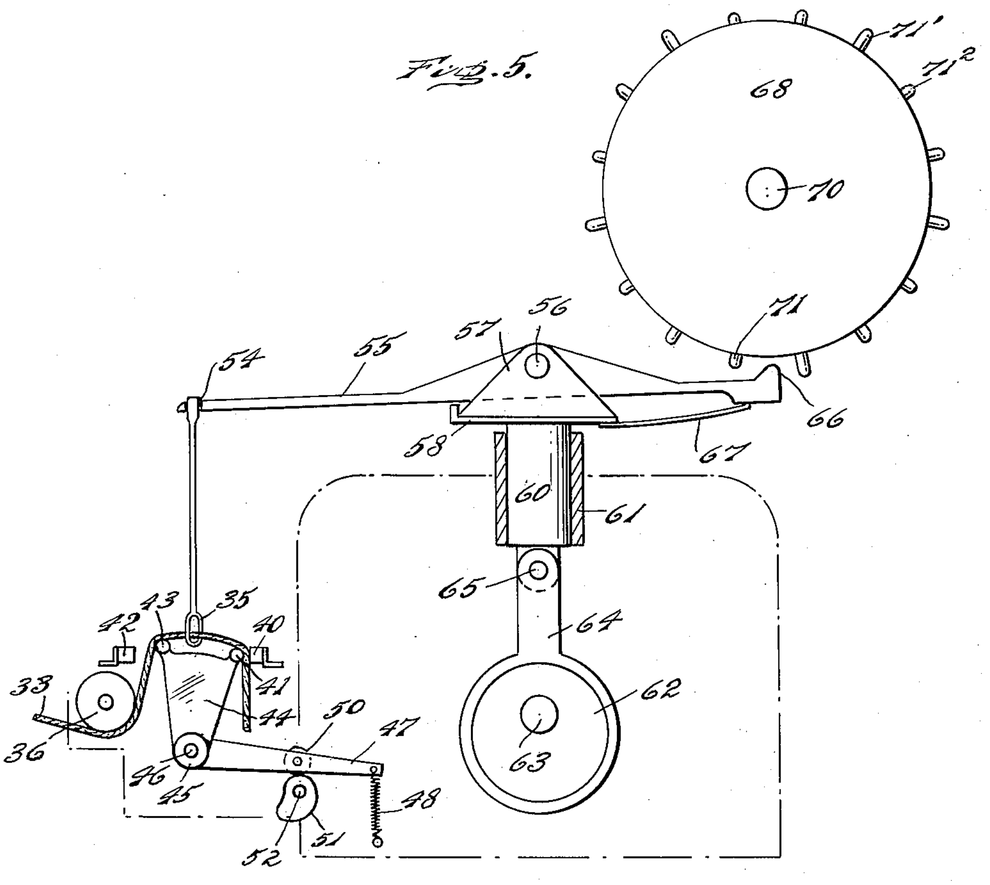
Figure 5 is a view similar to Figure 4, but showing the yarn feed in the position in which the needles are advancing.
Figure 6:
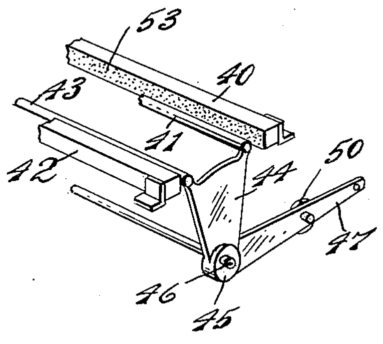
Figure 6 is a fragmentary perspective showing the clamps.

The two movable jaws 41 and 43 of the clamps are spaced apart less than the full width between the relatively fixed jaws 40 and 42 so that as best seen in Figures 4, 5 and 6 only one of the clamps can be closed at a time and the other must be open as the bell crank oscillates back and forth under the action of the cam 51.

Each of the relatively stationary jaws 40 and 42 is suitably roughened at 53 on its clamping face so that it will hold the yarn ends between it and the relatively movable jaw when the corresponding clamp is closed. If desired the relatively stationary jaws will be formed or covered with a resilient material such as rubber so that the clamps will grip notwithstanding slight differences in stroke of the movable jaws.

Each eye 35 consists of an opening or slot in a wire or strip which is pivotally hung at 54 at one end of a pattern control lever 55 which is pivoted between its extremities at 56 suitably on a pivot which extends transversely of the machine and pivots all of the pattern levers (one for each yarn end).

The transversely extending pivot shaft 56 is mounted on bearings 57 which extend upwardly from a transversely extending pivot bar 58. The pivot bar 58 is supported at its ends on plungers 60 which are guided in reciprocation by suitably vertical guides 61. The plungers 60 are reciprocated up and down, in the sequence later explained, by eccentrics 62 at each end on an eccentric shaft 63. Each eccentric is surrounded by an eccentric strap 64 which pivotally connects at 65 to the corresponding plunger.

At the end remote from its connection to the eye 35 each lever 55 has a follower projection 66 which is urged by a leaf spring 67 against a pattern control projection. The leaf springs are mounted on the pivot plate 58.

The pattern control may take the form as shown in Figures 1 to 11 of a cylinder 68 pivoted on a shaft 70 and advanced by suitable mechanism as well known the distance between one row of projections and the next for each stitch. Extending in a line from end to end of the cylinder is a series of projections 71 suitably mounted as by forced fits in holes in the cylinder, and sticking out from the cylinder an amount which varies according to the pattern and controls the position of the follower projection 66 at the time that a particular pile projection on the particular pile yarn end is being made.

Thus one of the projections 71' is suitably long and another projection 71² is suitably short and the projections are individual for each pile projection throughout the pattern repeat, which may have as many steps as there are steps around the roll.

In some cases it will be preferable to use a pattern chain or dobby chain instead of a cylinder, and this is shown in Figure 12. In this form the chain 72 has any suitable number of strands which are guided over sprockets 73 and at each link position shafts 74 extend laterally for the full width of the machine and carry a series of rollers 75 which are individual to each one of the levers 55 at each link position. Thus the rollers may be large as at 75' or small as at 75² or any intermediate size individual to the particular pile projection.

In operation, in the position of Figure 4 or Figure 12 the pattern control mechanism engages the follower projection 66 on each individual lever 55 and holds each of the levers in a particular and suitably different position depending upon the pattern desired at that stitch. At that time the gang of needles is retracting, as shown in Figures 10 and 11, and also at that time the clamp is engaged between each eye 35 and the corresponding needle, while the clamp is free between the yarn source and the eye. The motion of the particular pattern control lever 55 draws yarn from the source to produce a loop 76 (Figure 4) which depends for its size on the height of the projection 71 engaging the follower projection 66 of the particular pattern lever. The loop is formed by the upward motion of all of the pivots 56 in unison under the action of the eccentrics 62. All of this action just described takes place during the retraction of the gang of needles.

By the time the needles are ready to advance, the clamps shift under the action of the cam 51 to the position shown in Figure 5. In this position the clamp between the eyes 35 and the yarn source is closed and the clamp between the eyes 35 and the needle is open. The needles now advance and at the same time the pattern control has moved forward so that the follower end 66 is no longer engaging a pattern projection, but is free to retract under the action of the spring 67. Figure 5 shows this retraction in process. At the same time eccentrics 62 retract pivot 56 to its lower position. Therefore as the needles advance carrying the yarn through the fabric to make the pile projections, the tension on each individual yarn end forming each pile projection varies widely depending on the height of the loop 76 which was previously formed. There is thus a difference in the height of the ultimate pile projection which is produced and the ultimate pile projection will vary widely. The individual pile loop in being formed by the stitch may pull yarn from the previous stitch as well known in the art.

Thus as shown in Figure 13 on one pile yarn end 33' there is a succession of pile projections 32 of widely differing heights, and on the next pile yarn end 33² (Figure 14) there is a wholly different succession of different heights of pile projections 32. For example at one position 77 on pile end 33' the pile projection is tall while on pile end 33² the corresponding pile projection 77' in the same transverse row is short. Correspondingly, at pile projection 78 on pile yarn end 33' there is a low pile, but at corresponding pile projection 78' on pile yarn end 33² there is a high pile.

This feature of individual control of the height of pile projections, whether cut or uncut, can be used to advantage to obtain colored pattern effects. It will of course be understood that the pile projections can be cut as well known in the art. Thus as shown in Figure 16, the series of pile yarn ends consist of alternate ends 80 of one color and 81 of another color. In one pattern area where the color of the end 81 is to be shown, pile projections 82 of ends 81 are uniformly made high and pile projections 83 of ends 80 are uniformly made low. In another pattern area where the color of pile ends 80 is to show in the face of the fabric, pile projections 84 of ends 80 are uniformly made high and pile projections 85 of ends 81 are uniformly made low. Thus the ends which are not to show are partially or wholly masked by the taller ends immediately beside them in the pile. This principle may be applied using more than two color combinations as long as the colors which are not to show or are to show only partially can be adequately masked.

In view of my invention and disclosure variations and modifications to meet individual whim or particular need will doubtless become evident to others skilled in the art, to obtain all or part of the benefits of my invention without copying the method, apparatus and fabric shown, and I, therefore, claim all such insofar as they fall within the reasonable spirit and scope of my claims.

Having thus described my invention what I claim as new and desire to secure by Letters Patent is:

1. In a yarn feed for advancing a plurality of yarns along paths of travel from a source of the yarn, a plurality of loop pullers in side by side loop pulling positions and having eyes in the paths of travel of the yarns to receive the yarns, clamping means adapted in one position to grip each yarn on the side of the related loop puller eye toward the source of yarn, and adapted to release each yarn on the side of the loop puller eye away from the source of the yarn, the clamping means in another position being adapted to clamp each yarn on the side of the loop puller eye remote from the source of yarn and adapted to release each yarn on the side of the loop puller eye toward the source of yarn, lever means interconnected at one end with each loop puller eye and means engaged with the lever means for moving each loop puller eye to a predetermined yarn pulling distance different for different eyes.

2. A yarn feed comprising a plurality of loop control levers pivoted intermediate the ends thereof, means for reciprocating the pivots of all of the levers together transversely to the lengths of the levers, an eye on each one of the levers adjacent one end adapted to receive and manipulate an individual yarn, a relatively stationary clamping jaw located along the path of travel of each yarn on the side of the eye remote from the source of yarn, a relatively stationary clamping jaw located along the path of travel of each yarn on the side of the eye toward the source of yarn, relatively movable clamping jaws cooperating with the relatively stationary clamping jaws, means for moving the relatively movable clamping jaws to close against one of the relatively stationary clamping jaws while opening with respect to the other relatively stationary clamping jaw, and pattern means for selectively positioning the ends of the loop control levers remote from the eyes to selectively vary the lengths of yarn drawn from source.

3. A yarn feed according to claim 2, in which the means for selectively positioning the ends of the loop control levers comprises a pattern control drum, and projections around the drum cooperating with the ends of the loop control levers remote from the eyes and differing in length for different levers.

4. In a yarn feed for advancing a plurality of yarns along paths of travel from a source of the yarn, a plurality of loop pullers in side by side loop pulling positions and having eyes in the paths of travel of the yarns to receive the yarns, clamping means adapted in one position to grip each yarn on the side of the related loop puller eye toward the source of yarn, and adapted to release each yarn on the side of the loop puller eye away from the source of the yarn, the clamping means in another position being adapted to clamp each yarn on the side of the loop puller eye remote from the source of yarn and adapted to release each yarn on the side of the loop puller eye toward the source of yarn, means interconnected at one end with each loop puller eye and means engaged with the said last mentioned means for moving each loop puller eye to a predetermined yarn pulling distance different for different eyes.

References Cited in the file of this patent

UNITED STATES PATENTS

| | | |
|---|---|---|
| 793,674 | Mayer | July 4, 1905 |
| 876,562 | Kleutgen | Jan. 14, 1908 |
| 1,329,933 | Schick | Feb. 3, 1920 |
| 1,831,485 | Dykeman | Nov. 10, 1931 |
| 1,863,049 | Hermann | June 14, 1932 |
| 1,909,531 | Gladish | May 16, 1933 |
| 2,226,631 | Miller | Dec. 31, 1940 |
| 2,354,731 | Ashworth et al. | Aug. 1, 1944 |
| 2,360,398 | Case | Oct. 17, 1944 |
| 2,652,616 | Knott | Sept. 22, 1953 |

FOREIGN PATENTS

| | | |
|---|---|---|
| 404,681 | Great Britain | Jan. 22, 1934 |
| 562,086 | Great Britain | June 16, 1944 |